United States Patent [19]

Coates, Jr.

[11] 4,149,111
[45] Apr. 10, 1979

[54] METHOD AND APPARATUS FOR MODULATING THE PERCEPTIBLE INTENSITY OF A LIGHT EMITTING DISPLAY

[75] Inventor: William J. Coates, Jr., San Diego, Calif.

[73] Assignee: Science Applications, Inc., La Jolla, Calif.

[21] Appl. No.: 854,891

[22] Filed: Nov. 25, 1977

[51] Int. Cl.² .......................... G06F 3/14; G08B 5/36
[52] U.S. Cl. .................................. 315/169.4; 340/767;
340/771; 365/116; 340/814
[58] Field of Search ................... 365/116; 340/324 M,
340/340, 335, 343; 315/169 R, 169 TV

[56] References Cited

U.S. PATENT DOCUMENTS

| | | | |
|---|---|---|---|
| 3,098,215 | 7/1963 | Waite | 365/116 |
| 3,798,632 | 3/1974 | Liddle | 340/324 M |
| 3,821,721 | 6/1974 | Hughes | 365/116 |
| 3,863,023 | 1/1975 | Schmersal et al. | 340/324 M |
| 4,087,806 | 5/1978 | Miller | 340/324 M |

Primary Examiner—Marshall M. Curtis
Attorney, Agent, or Firm—Bruno J. Verbeck; John L. Haller

[57] ABSTRACT

A method and apparatus for modulating the perceptible intensity of the presentation of a light emitting display which light emitting display emits light by gas discharge and recombination of ions and free electrons of a display medium; includes a system clock, the interruption of which causes the interruption of the presentation of the light emitting display; and is capable of retaining display information upon the interruption of a light sustaining signal or the electrical power as a result of an accumulation and retention of electrical charge across the display medium. The apparatus comprising a repetition means for generating a repetition pulse train signal having a controllable frequency and duty cycle; an indication means for generating a retention signal that identifies when the light emitting display is capable of retaining display information; a synchronization means coupled to said repetition means and to said indication means for generating a gating signal which is synchronized with the retention signal and the repetition pulse train signal; and stopping means coupled to said synchronization means for interrupting the system clock in synchronization with the gating signal. Variations of this invention include circuitry which generates a control system clock signal by clock pulse train generator and modified stopping means. Other variations enable the light emitting display to be turned off over extended periods of time.

17 Claims, 6 Drawing Figures

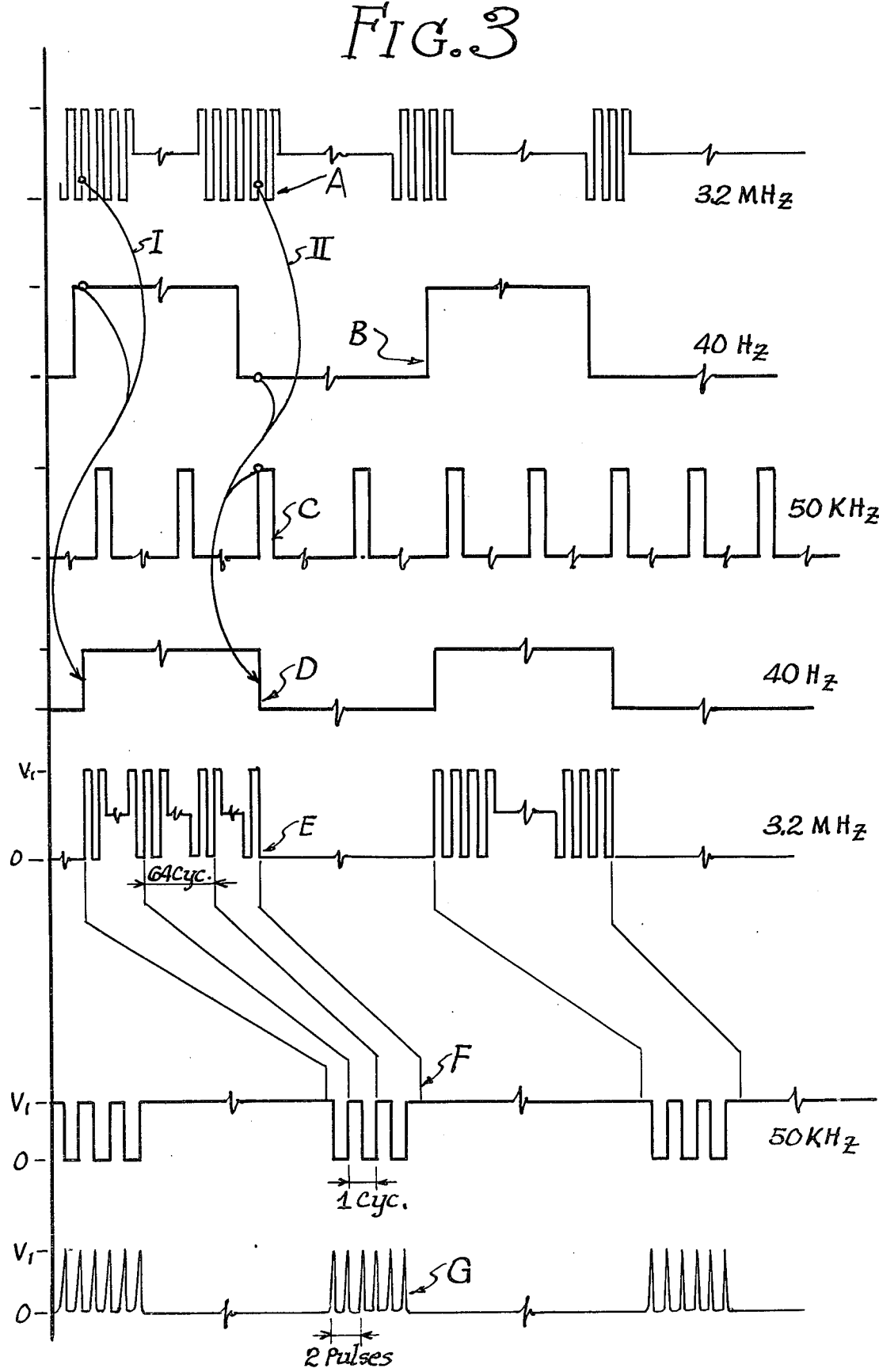

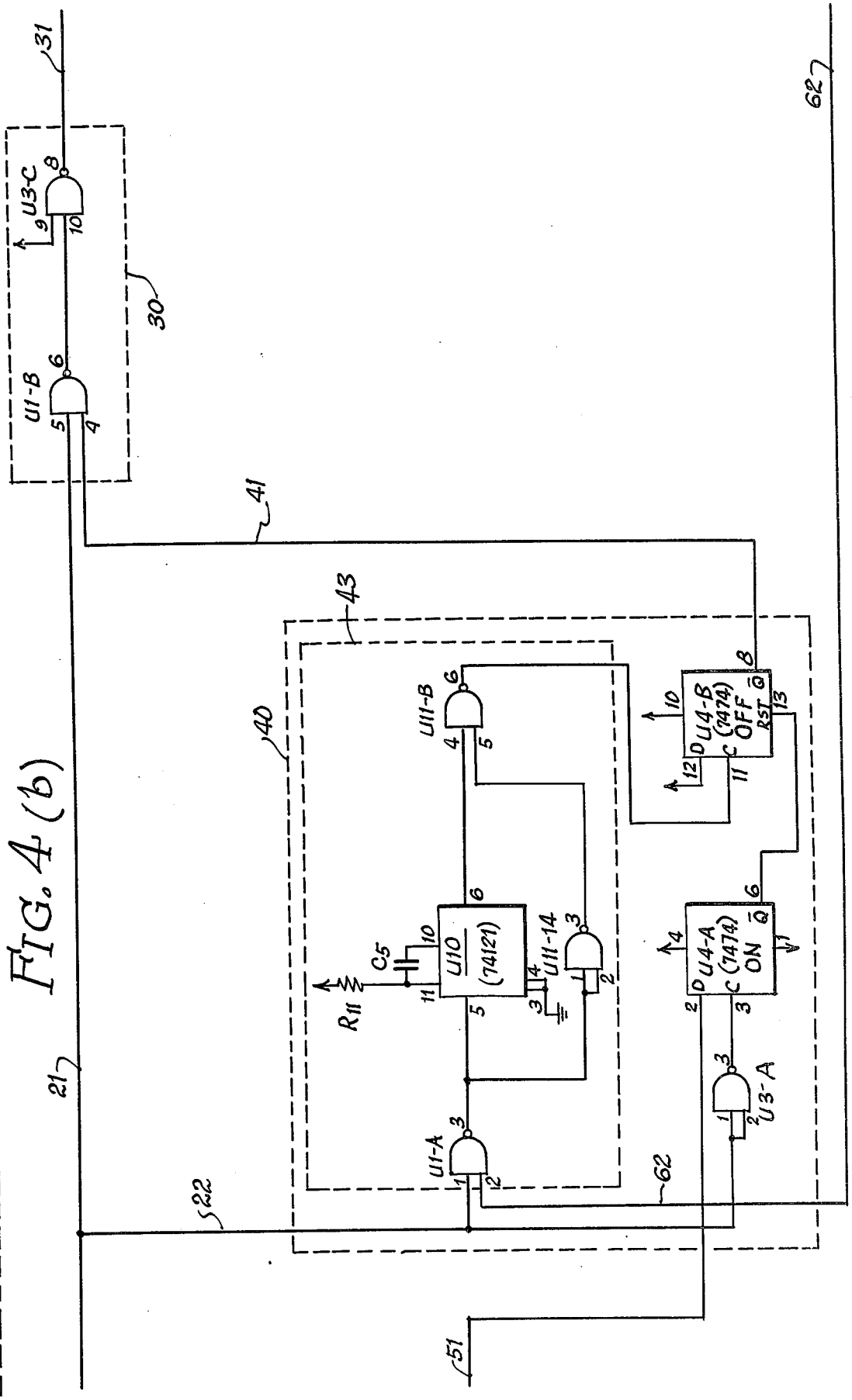

METHOD AND APPARATUS FOR MODULATING THE PERCEPTIBLE INTENSITY OF A LIGHT EMITTING DISPLAY

BACKGROUND OF THE INVENTION

1. Field of the Invention

This invention relates to a new and unique method and apparatus for modulating the perceptible intensity of the presentation of a light emitting display. While a wide variety of light emitting displays are available, this invention is directed to those light emitting displays which include a display apparatus and the driving circuitry therefore and are characterized as emitting light by gas discharge with ion and electron recombination of a display medium, as including a system clock, the interruption of which causes an interruption in the presentation of the light emitting display, and as being capable of retaining display information upon the interruption of either a light sustaining signal or the electrical power as a result of an accumulation and retention of electrical charge across the display medium.

W. E. Johnson and M. J. Schmersal in their paper, *A Quarter-Million Element AC Plasma Display With Memory*, Society for information Display, 1971, International Symposium Digest for Technical Papers, May 197, discusses an example of a typical light emitting display which is appropriate for use with this invention. The light emitting display Model 80-33 Digivue (Trademark) Display/Memory Unit D223 by Owens Illinois Glass Company is appropriate for use with this invention and includes interface circuitry that accomodates an input light sustaining signal at a nominal frequency of 50 $KH_z$ with a voltage differential of about ±95 volts. While the light emitting displays themselves are capable of accepting a varying input frequency, the nature of the interface circuitry often limits the frequency range to about 30 $KH_z$ to 65 $KH_z$.

2. Description of the Prior Art

Modulating the perceptible intensity of light can be effected by either directly or indirectly reducing the actual intensity of the light emitted or alternatively by periodically interrupting the emitted light and permitting the persistence of the vision of the human eye to perceive an averaged intensity of the emitted light.

One method which reduces the actual intensity of the light includes the use of an external apparatus to absorb or filter the emitted light. This light absorption may be accomplished by a simple mechanical neutral density filter or by an electrically controlled colloidal light valve as discussed by A. Davis, et al., in their paper *Colloidal Light Valve (CLV) Digital Display*, Society for Information Display, 1975, International Symposium Digest for Technical Papers, April 1975. While these filters reduce the intensity of each light pulse in an analogous manner and control the intensity from the maximum output to the lowest perceptible output without flicker, they are easily misaligned and include absorbing and reflecting surfaces which interfere with the maximum perceived intensity of the light source.

The alternative method, periodically interrupts the light source to reduce the perceptible intensity of the light, provided that the intensity of the light, the rate at which the light is turned off and on, and the duration of time that the light is off does not create a perceptible light flicker. Thus, for a given combination of conditions of light intensity, frequency of OFF and ON states, and duration of the ON state, the human eye will no longer average the intensity of the light, but will perceive a flicker or pulsation of light intensity.

Because of the nature of the display and drive circuitry used in conjunction with this invention, the generated light pulses are constant in both intensity and duration; that is, a light pulse is generated for appropriate transition, positive or negative, of a light sustaining signal, generally two light pulses for every full cycle of the light sustaining signal. Further, due to the nature of the display circuitry used with this display, the period of time that the light is on, the intensity of the light pulses, and the input frequency of the light sustaining signal are not adjustable. However, modulation of the perceived intensity of the light emitting display can be accomplished by controlling the number of cycles of the light sustaining signal over a given period of time.

Also, the technique of reducing the frequency of the light sustaining signal which is applied to the light emitting display has been used to modulate the intensity of the presentation of the light emitting display. However, due to the limitations imposed by the drive circuitry of the light emitting display, this method rarely yields more than a ten to one range in light intensities. (As discussed above, the conventional interface circuitry is generally limited to a range of about 30 $KH_z$ to 65 $KH_z$.)

Another method for reducing the perceptible intensity of the light emitting display is achieved by altering the shape of the light sustaining signal. A number of different light emitting states have been found as a result of altering the wave form of the light sustaining signal. However, no more than three such stable states have been discovered and the majority of light emitting displays are capable of accepting only two such states. Accordingly, no more than three possible levels of light intensity have been developed by this approach.

SUMMARY OF THE INVENTION

This invention relates to a new and novel method and apparatus for modulating the perceptible intensity of a light emitting display. The apparatus proposed by this invention employs the inherent information retention of the display information over relatively long periods of time of the light emitting display and the persistence of vision of the human eye to modulate the perceived light intensity. For example, the maximum intensity of the light emitting display identified above is achieved for a light sustaining signal having a nominal frequency of about 50 $KH_z$ for which two light pulses are emitted for every cycle of the light emitting display so that light pulses are generated at a rate of about 100 KHz. Simple modulation of the light intensities is accomplished by repetitively and periodically interrupting the light emitting display for discrete cycles of the light sustaining signal.

A far wider range of modulation of the intensity of the light emitting display is provided by dynamically adjusting both the frequency and duration of this interruption and by interrupting the light emitting display in synchronization with the information retention state of the display equipment.

One problem in conventional light modulation equipment results from the ability of the human eye to perceive a pulsation in light intensity resulting from individual light pulses or from the absence of individual light pulses in a continuous series of light pulses. The range of parameters which produce the substantially wider range of light intensities for the above described light emitting display without a perceptible flicker are from a minimum light intensity achieved with a repetition rate or interruption frequency of about 10 Hz with a duty cycle, or the length of time of the interruption, that allows a single cycle of the light sustaining signal or two light pulses, to substantially maximum intensity (the maximum intensity being derived from an uninterrupted 50 KHz light sustaining signal) achieved with a repetition signal of at least 40 Hz having a duty cycle that interrupts the light emitting display for a single cycle of the light sustaining signal or two light pulses.

The correlation between that frequency of a light source and the amount of light received by the eye which causes a perceptible flicker is presented in the graphical representation, Critical Frequency of Flicker by John W. T. Walsh in his book "*Photometry*," 1958, Third Edition, Dover at page 70. This correlation shows a generally linear relationship between the frequency of the light source and the logarithm of the quantity of received light. FIG. 1 of the drawings, presents a rough relationship, Representation I, between the repetition frequency along the vertical axis and the duty cycle (a simplified approximation of the amount of light) along the horizontal axis. While there is no precise algorithm relating the John W. T. Walsh graphical representation to FIG. 1, FIG. 1 does show the general relationship between repetition frequency, duty cycle, and flicker perception. A flicker in the light emitting display is perceived for combinations of repetition frequency and duty cycle which fall below Representation I.

Optimum results can be achieved by reducing the duty cycle from 100% to a minumum level that permits a single cycle of the light sustaining signal to be transmitted, then by reducing the repetition rate from 40 $H_z$ to approximately 10 $H_z$. Alternatively, it is possible to reduce both the repetition rate and the duty cycle in the manner indicated by Representation I of FIG. 1. These adjustments provide the maximum range of intensity of the light emitting display. The ability to independently adjust both the repetition rate and the duty cycle provides a substantially wider range of light intensities without flicker, particularly for the lower intensities. In practice, the apparatus of this invention interrupts the light emitting display in synchronization with the repetition signal having an adjustable duty cycle and a retention signal; the retention signal indicating the retention state of the light emitting display.

It is an object of this invention to provide an apparatus for adjustably modulating the perceptible intensity of the presentation of a light emitting display over a wide range of light intensities. A further object of this invention is to provide an apparatus for interrupting the system clock of a light emitting display. A further object of this invention is to provide an apparatus enabling the light sustaining signal or electrical power of a light emitting display to be interrupted while providing maximum retention of the display information.

BRIEF DESCRIPTION OF THE DRAWINGS

The following is a brief description of the accompanying drawings.

FIG. 3 is a graphical representation showing the relationships between the clock pulse train, the repetition pulse train, the gating signal, the retention signal, the system clock signal, a representative light sustaining signal, and the light pulses.

DESCRIPTION OF THE PREFERRED EMBODIMENT

Figure 1:
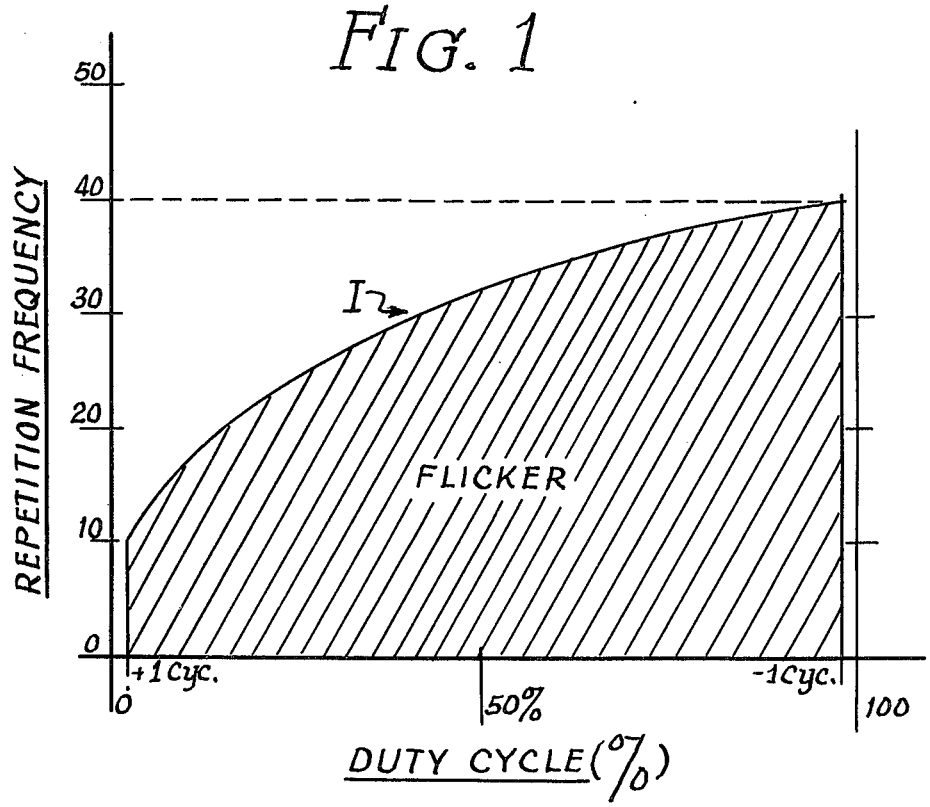
FIG. 1 is a graphical representation showing the minimum flicker conditions as a function of the flicker frequency and duty cycle of the repetition signal.

As discussed above, FIG. 1 is a rough graphical representation of the relationship between the repetition frequency and the duty cycle whereby Representation I indicates the minimum perameters for the undesirable perceptible flicker. Combinations of frequency and duty cycle above Representation I would not create a perceptible flicker while combinations below would. The maximum range of light intensities is achieved by dynamically varying the repetition frequency and duty cycle in the manner indicated by Representation I.

Figure 2:
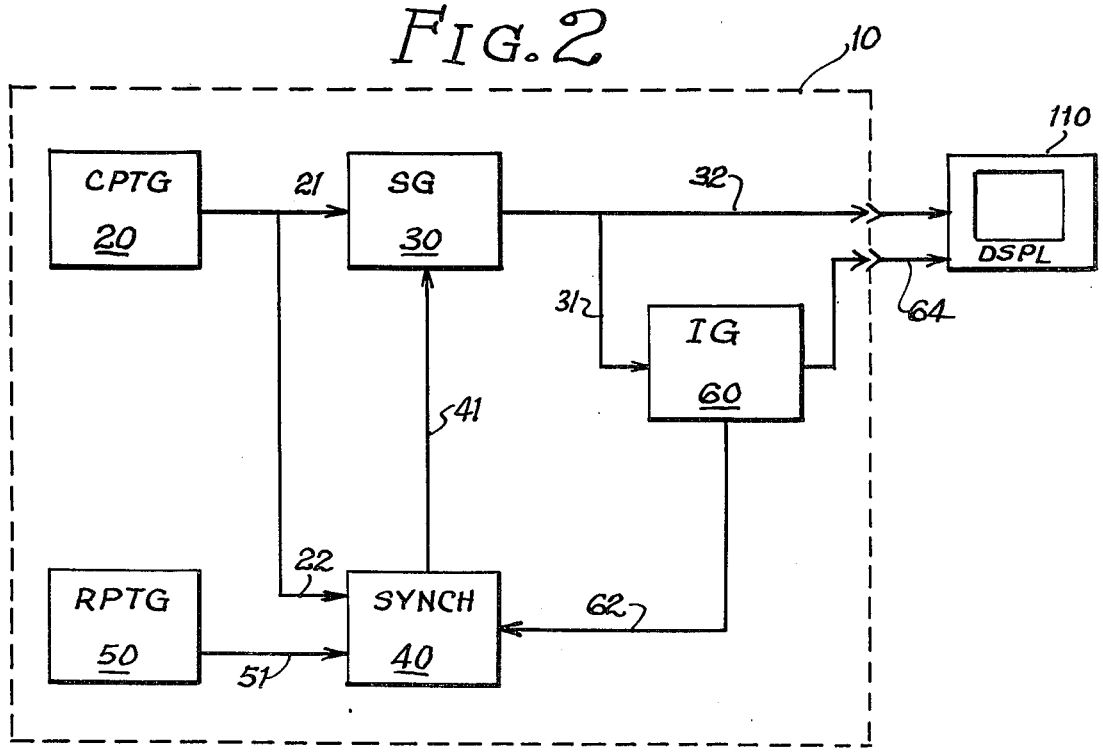
FIG. 2 is a block diagram showing the functional embodiment of an apparatus that modulates the perceptible intensity of a presentation of a light emitting display.

FIG. 2 shows a functional block diagram of an apparatus used to modulate the perceptible intensity of the presentation of a light emitting display. The modulation apparatus is shown generally at 10 and the light emitting display is shown at 110. The modulation apparatus 10 includes a clock pulse train generator 20 (clock means) which generates a clock pulse train signal; a repetition pulse train generator 50 (the repetition means) which generates a repetition pulse train signal, having an adjustable frequency and duty cycle; a synchronizer 40 (the synchronization means) which generates a gating signal, the logically true or active state of which is in synchronization with the logically true or active state of the repetition pulse train signal and the logically false or inactive state of which is in synchronization with the logically false or inactive state of the repetition pulse train signal and the active state of a retention signal; stopping generator 30 (stopping means) which generates a control system clock signal by interrupting the clock pulse train signal in synchronization with the gating signal; and indication generator 60 (indication means) which generates the retention signal by decoding the system clock signal to provide an active retention pulse at the point in time that the light emitting display is capable of retaining display information upon the interruption of either the light sustaining signal or the electrical power. The indication generator 60 also provides clock phase control to the light emitting display 110.

The clock pulse train signal which is generated by the clock pulse generator 20 is fed over line 21 to the stopping generator 30 and over line 22 to the synchronizer 40. The repetition pulse train signal which is generated by the repetition pulse train generator 50 if fed over line 51 to the synchronizer 40. The gating signal which is provided by the synchronizer 40 is fed over line 41 to the stopping generator 30 which then generates the control system clock signal that is fed over line 31 to the indication generator 60 and over line 32 to the light emitting display 110. The indication generator 60 provides the retention signal which is fed over line 62 to the synchronizer 40, and the phase control signals which are fed over line 64 to the light emitting display 110.

The clock pulse train generator 20 is a conventional frequency generator such as a voltage controlled frequency oscillator a back-to-back monostable multivibrator or a conventional RC timing circuit. The clock pulse train generator 20 produces a clock pulse train signal which has a characteristic frequency of about, for example, 3.2 MHz which is 64 times the characteristic frequency of the light sustaining signal. In a similar manner, the repetition pulse train generator 50 generates an adjustable repetition pulse train signal having a characteristic frequency of about 0 to 100 Hz. The repetition pulse train generator 50 also includes a duty cycle generator (see FIG. 4) which adjustably controls the length of the logically true or active state of the repetition pulse train signal; that is the ratio of time the repetition pulse train signal is true or active relative to the time of a complete cycle of the repetition pulse train signal.

The repetition pulse train signal is connected by line 51, and the clock pulse train signal is connected by line 22, and a retention signal is connected by line 62 to the synchronizer 40. The gating signal is generated by the synchronizer 40 such that the gating signal goes active or logically true in synchronization with the positive transition of the repetition pulse train signal. The gating signal is set active or logically true until both the retention signal is logically true or active and the repetition pulse train signal is logically false or inactive whereby the gating signal is reset inactive or logically false. Both the positive and negative transitions of the gating signal may be triggered by the clock pulse train signal for internal timing purposes.

The gating signal is connected over line 41 and the clock pulse train signal is connected over line 21 to the stopping generator 30. The stopping generator 30 effectively interrupts the clock pulse train signal in synchronization with the gating signal by logically disabling the clock pulse train signal during periods when the gating signal is logically false or inactive and enables the clock pulse train signal when the gating signal is logically true or active thus generating the control system clock signal. The control system clock signal is fed over line 32 to the light emitting display 110 where it is used by the light emitting display 110 in lieu of its internal system clock. The control clock signal also connects over line 31 to the indication generator 60.

The indication generator 60 includes circuitry to generate the retention signal, such as a conventional frequency divider circuit and a counter decoding circuit. The frequency divider circuit divides the characteristic frequency of the control system clock signal by a specific ratio to generate a frequency representative of the light sustaining signal, which has a characteristic frequency of about 50 KHz and other intermediate frequencies, such as 100 KHz, 200 KHz 400 KHz, and 800 KHz. All frequencies are provided over line 64 to the light emitting display 110 to maintain clock phase control therewith. The counter decoding circuitry logically compares a numerical value set in a bank of switches which represents the cycle count of the system clock signal in which the light emitting display is capable of retaining display information, with the changing state of the various intermediate frequencies provided by the frequency divider circuit and generates an active retention pulse when a comparision is made. The numerical value used to indicate the display's capability to retain display information and the active retention pulse correspondes to a point in time after the gas discharge of the display medium and before the next transition, either positive or negative, of the light sustaining signal.

FIG. 3 is an example of a timing diagram of the modulation apparatus showing the relationships between its various electronic signals. In referring to FIG. 3, Representation A shows the continuous clock pulse train signal generated by the free running sustaining clock pulse train generator 20 at a representative 3.2 MHz. Representation B shows the repetition pulse train signal generated by the repetition pulse train generator 50 at a representative 40 Hz. Representation C shows the retention signal developed by the indication generator 60 indicating the point in time within a major light sustaining signal cycle that the light emitting display 110 is capable of retaining display information. The retention pulse typically is true for one full minor cycle of the characteristic 3.2 MHz system clock signal for every major cycle of the light sustaining cycle.

The specific minor cycle, of the 64 cycles of the 3.2 MHz system clock signal which constitutes a major cycle of a light sustaining signal, is determined empirically and is decoded by the indication generator 60 to identify the time of maximum data retention capability of the light emitting display.

Representation D shows the gating signal produced by the display synchronizer 40. Representation I shows the gating signal going true or active at the first positive transition of the clock pulse train signal after the repetition pulse train signal has gone true or active. Representation II shows the gating signal going false or inactive at the positive transition of the clock pulse train signal after the repetition pulse train signal has gone false or inactive and the retention signal has gone true or active.

Representation E shows the control system clock signal as generated by the stopping generator 30. Representation F is a representative indication of the timing for the light sustaining signal which is used by the light emitting display 110. The light sustaining signal has a characteristic frequency of 50 KHz. Representation G indicates the light pulses generated by the light emitting display as a result of the light sustaining signal.

Figure 4A:
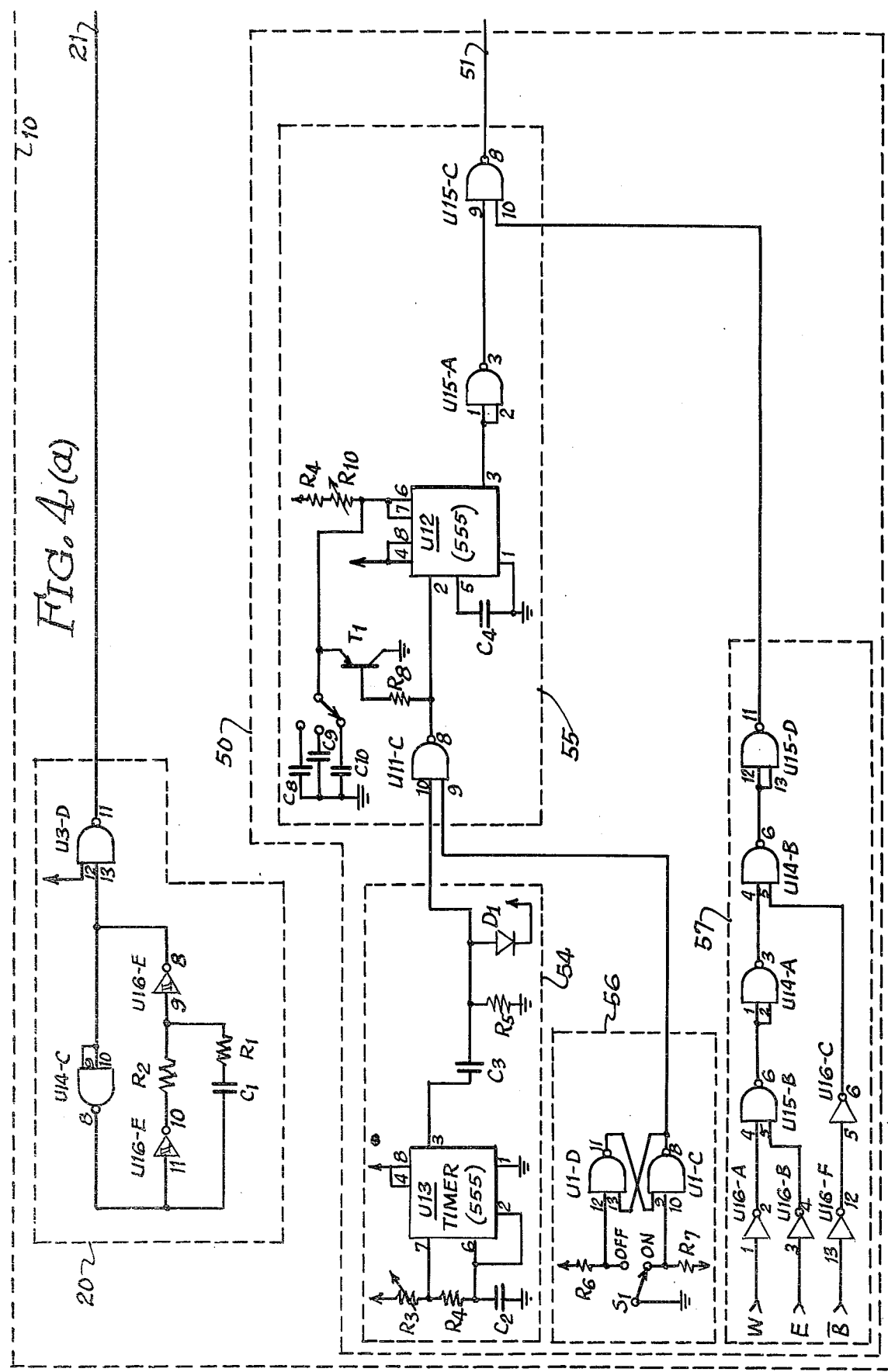
FIG. 4 (comprised of a and b) is a schematic representation showing an apparatus used to modulate the perceptible intensity of the presentation of a light emitting display.

FIG. 4 shows a schematical representation of a specific embodiment for an electrical circuit 10 which produces a control system clock signal used to modulate the perceptible intensity of the presentation of a light emitting display. With reference to FIG. 4(a) the clock pulse train generator shown generally at 20 includes three invertors U14-C, U16-D, and U16-E, connected to form a ring having a conventional RC timing circuit connected across U16-E such that a square wave clock pulse train signal having a characteristic frequency of 3.2 MHz is generated at the output of U16-D. The output of U16-D is coupled to a final inverting element U3-D. Inverting elements U14-C and U3-D may be conventional NAND gates (such as SN7400N available from Texas Instruments) connected as logical signal invertors and elements U16-D and U-16E may be conventional Schmitt triggors (such as SN7414N available from Texas Instruments).

The repetition pulse train generator 50 includes a rep-rate clock circuit 54, a duty cycle circuit 55, a Turn-Off circuit 56 and a system override circuit 57. Rep-rate clock circuit 54 includes a pulse generator U13 (such as SN555 available from Texas Instruments) with resistors, capacitors and diodes connected to provide a rep-rate pulse train having positive pulse of about 10 microseconds at a frequency of about 50 Hz. The frequency of the rep-rate circuit 54 is adjustable between about 0 and 100 Hz by adjusting variable resistor R3. The output of the rep-rate generator is coupled to one input of oring circuit U11-C.

The Turn-Off circuit 56 includes NAND gates U1-D and U1-C connected as a conventional R-S flip-flop with a single pole double throw switch S1, having conventional pull up resistors, providing a rep-rate override turn-off signal to the other input of oring circuit U11-C. The duty cycle generator 55 includes timing circuit U12 (such as SN555 available from Texas Instruments) and resistors, capacitors, diodes, transistors, and variable resistor R10 connected such that the pulse length of the repetition pulse train signal can be adjusted. The oring circuit U11-C allows the duty cycle generator 55 input from the rep-rate clock circuit 54 to be overriden by Turn-Off circuit 56. The output of the duty cycle generator is logically inverted at U15-A then coupled to the system override gate U15-C, a conventional NAND gate. The positive pulse length or duty cycle of the repetition pulse train signal is adjusted by means of variable resistor R10 and by switch S4 which connects various sized capacitors C8, C9, and C10.

The specific embodiment presented in FIG. 4 includes a system override circuit 57 which interrupts the repetition pulse train signal for various operating states of the display equipment; namely, write (W), erase (E), and bulk (B) requests. The system override circuit 57 includes invertors and NAND gates conventionally connected so that the logical OR of the three operating states is provided at a final invertor U15-D which is then coupled to system overriding gate U15-C. The system override circuit 57 operates such that its output at U15-D is held low during the active state of any of the three operating states thereby overriding the repetition pulse train signal at system override gate U15-C. When none of the operating states are active, the system override circuit 57 output is high allowing the system override gate U15-C to impose a final inversion of the repetition pulse train signal.

Referring to FIG. 4(b), the synchronizer 40 generates a gating signal which enables the stopping generator 30 to provide the control system clock signal in synchronization with the clock pulse train signal, the repetition pulse train signal and the retention signal. The synchronizer 40 includes both an OFF, U4-B and ON, U4-A, D edge Trigger Flip-Flop (such as SN7474 available from Texas Instruments).

The repetition pulse train signal is connected over line 51 to the Input "D" Terminal of the ON Flip-Flop, U4-A,2; the clock pulse train signal, after being inverted at gate U3-A is connected to the clock terminal of the ON Flip-Flop, U4-A,3; and $\overline{Q}$ Output Terminal of the ON Flip-Flop U4-A,6, is connected to the Reset Input Terminal of the OFF Flip-Flop U4-B, 13. In this configuration the ON Flip-Flop U4-A is set or activated at the first positive transition of the clock pulse train signal after the retention pulse train signal has gone true, setting the $\overline{Q}$ Output Terminal of the ON Flip-Flop U4-A,6 low. The low state of the $\overline{Q}$ Output Terminal of the ON Flip-Flop U4-A,6 thereby forces and holds Off Flip-Flop U4-B in the reset or Off state at the Reset Input Terminal of the OFF Flip-Flop U4-B, 13 without regard to other input signals of the Off Flip-Flop U4-B. The reset state of the OFF Flip-Flop U4-B forces the $\overline{Q}$ Output Terminal of the OFF Flip-Flop U4-B,8, the gating signal, high. Accordingly, the first positive transition of the clock pulse train signal after the repetition pulse train signal goes high results in the gating signal going high.

Similarly, the first positive transition of the clock pulse train signal after the repetition pulse train signal has gone false causes the ON Flip-Flop U4-A to reset whereby the $\overline{Q}$ Output Terminal of the On Flip-Flop U4-A,6 which is connected to the Reset Input Terminal of the OFF Flip-Flop U4-B,13 goes high. The high signal at the Reset Input Terminal of the OFF Flip-Flop U4-B,13 does not change the state of the OFF Flip-Flop, U4-B, that is its set/reset condition, but does release the forced reset condition permitting other inputs of the OFF Flip-Flop U4-B to control its status.

The "D" Terminal of the OFF Flip-Flop, U4-B, 12 is connected to the logic power source creating a logically true state whenever power is on. Accordingly, the OFF Flip-Flop U4-B is set by the first positive transition of a shaped signal which is generated by shaping circuit 43, (the logical AND function of the clock pulse train signal and the retention signal) which is connected to the Clock Input Terminal of the OFF Flip-Flop, U4-B, 11 after the reset of the ON Flip-Flop U4-A. The setting of the OFF Flip-Flop U4-B causes its $\overline{Q}$ Output Terminal U4-B, 8 and the gating signal, to go low.

The shaping circuit 43 includes a NAND gate U1-A and a signal forming monostable multivibrator U10 (such as SN74123 available from Texas Instruments) having resistors and capacitors which produce a 10 micro-second pulse. The shaping circuit also includes a single shot by-pass invertor U11-A and a summing NAND gate U11-B. The shaping circuit 43 provides a shaped logical AND signal of the clock pulse train signal and the retention signal which is input to the Clock Terminal of the OFF Flip-Flop, U4-B, 11.

The gating signal which is provided by the synchronizer 40 is coupled over line 41 and the clock pulse train signal is provided over line 21 to the stopping generator 30. The stopping generator 30 includes a gating NAND gate U1-B which effectively interrupts the clock pulse train signal provide over line 21. The output signal is inverted at gate U3-C and the generated control system clock signal is connected to the indication generator 60 over line 31 and to the light emitting idsplay 110 over line 32.

Figure 4C:
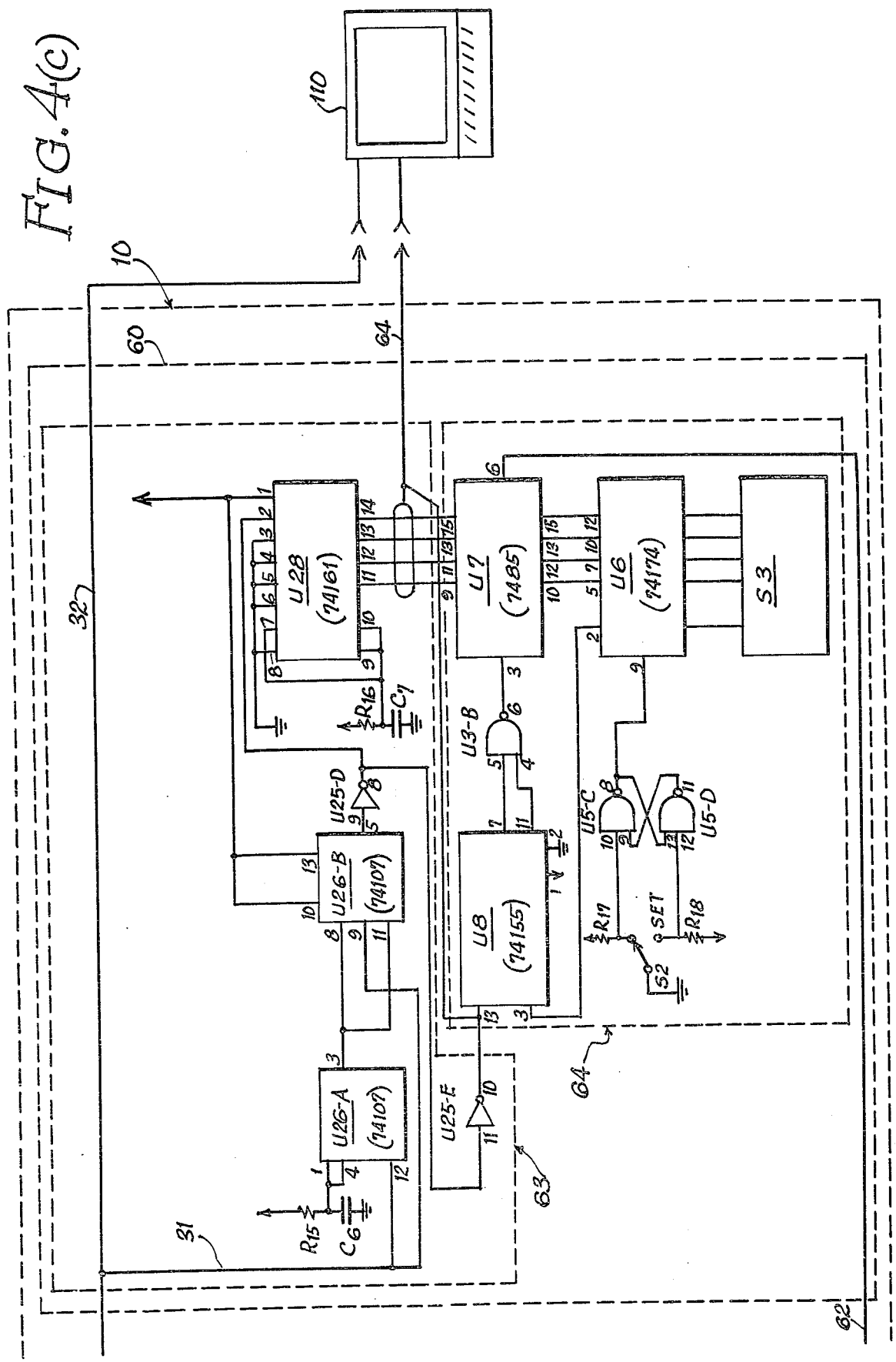

Referring to FIG. 4(c), the indication generator 60 provides the required frequency dividing circuitry 63 which generates intermediate frequencies and a count decoder circuit 64 which generates the retention signal. The actual dividing circuitry namely U26-A, U26-B U25-D, U28 and U25-E generates frequency outputs $\phi_0$ of 800 KHz, $\phi_1$ of 400 KHz, $\phi_2$ of 200 KHz, $\phi_3$ of 100 Khz, and $\phi_4$ of 50 KHz. Proper operation of this apparatus requires that the $\phi_4$, 50 KHz, frequency is in phase synchronization with the light sustaining signal applied to the light emitting display 110. Such clock phase synchronization control is provided by transmitting all frequency output to the light emitting display over line 64.

The counter decoder 64 includes switch bank S3 for establishing the binary count of the information retention count for the retention signal, comparing circuits U3, U8, and U7 and latching switches $S_2$ with gates U5-C and U-5D and conventional pull-up resistors. The comparing circuit provides an output pulse the retention pulse, when the number indicated by the switch bank S3 matches the state indicated by the combination of the output frequency provided by frequency dividing circuit 63.

By dynamically adjusting the frequency and duty cycle of the repetition signal, the interruption of the system clock signal is adjusted resulting in a perceptible modulation of the intensity of the presentation of the light emitting display over a range of about 10,000 to 1 where the minimum intensity is about one ten-thousandth of that of the maximum intensity.

The apparatus shown in FIG. 4 not only intermittently interrupts the control system clock signal, which results in the modulation of the intensity of the presentation of the light emitting display, but also, it is appropriate for stopping the control system clock signal for extended periods of time, such as days. The display may be effectively turned off by throwing switch S1 in the turn off circuit 56 (See FIG. 4(a)) to the off position. The electrical power to both this apparatus and the light emitting display may then be disconnected providing a high impedance to the light emitting display so that the accumulated electrical charge across the display medium is not readily dissipated. When electrical power is reapplied and switch S1 is turned on, the information retained within the light emitting display is again presented.

Variations of this invention include modified stopping means circuitry which interrupts the system clock within the light emitting display and thus avoids the necessity for the clock pulse train generator.

This invention employs the characteristic of the light emitting display to retain display information so that the light emitting display may be interrupted or turned off for extended periods of time without loss of display information when it is again turned on or continued. Also, this invention uses the persistence of vision of the human eye and its ability to integrate discrete light pulses without perceiving a flicker so that the intensity of the light emitting display can be modulated over a far wider range of intensities then has been perviously available.

It is understood that the above description of my invention is done to fully comply with the requirements of 35 USC 112 and is not intended to limit my invention in any way. It can be seen from the above description that variant forms of the apparatus for modulating the perceptible intensity of a light emitting display and specifically the design of the clock pulse train generator, the repetition pulse train generator, the synchronizer, the stopping generator, the indication generator, and the specific applicaiton of integrated circuits and components thereof could easily be developed within the skill of the art. Accordingly, such variant forms are considered to be within the scope and essence of my invention.

What is claimed is:

1. An apparatus for interrupting the presentation of a light emitting display, said light emitting display being of the type which emits light by the ionization discharge of a display medium, and which includes a system clock signal, the interruption of which causes an interruption in the presentation of the light emitting display, and which is capable of retaining display information on the interruption of a light sustaining signal as a result of the accumulation and retention of electrical charge across said display medium, such apparatus comprising:
    (a) turn-off means for generating a turn-off signal to indicate when the presentation of the light emitting display is to be interrupted;
    (b) indication means for generating a retention signal which identifies when the light emitting display is capable of retaining display information;
    (c) synchronization means coupled to said turn-off means and to said indication means for generating a gating signal which is in synchronization with the turn-off signal and the repetition signal; and
    (d) stopping means coupled to said synchronization means for interrupting the system clock signal of the light emitting display in synchronization with the gating signal so that the presentation of the light emitting display is interrupted.

2. The apparatus of claim 1 which further comprises a clock means for generating a clock pulse train signal, said stopping means being coupled to said clock means and to said synchronization means, and said stopping means generating a simulated system clock signal by interrupting the clock pulse train signal in synchronization with the gating signal, said simulated system clock signal being connected to said light emitting display such that the simulated system clock signal overrides the system clock signal of the light emitting display whereby the presentation of the light emitting display is interrupted.

3. The apparatus of claim 1 wherein the inactive state of the turn-off signal indicate when the presentation of the light emitting display is to be interrupted.

4. The apparatus of claim 1 wherein the active state of the retention signal identifies when the light emitting display is capable of retaining display information upon the interruption of the light sustaining signal.

5. The apparatus of claim 4 wherein the active state of the indication means is after the gas discharge of the display medium and is before the next transition, either positive or negative, of the light sustaining signal.

6. The apparatus of claim 1 wherein the inactive state of the gating signal is in synchronization with the inactive state of the turn-off signal and the active state of the retention signal.

7. The apparatus of claim 1 which further comprises a power down means for turning off the electrical power which is applied to the light emitting display after the system clock has been interrupted whereby a high impedance is coupled to the light emitting display.

8. A method for interrupting the presentation of a light emitting display, said light emitting display being of the type which emits light as a result of the ionization discharge of a display medium, and which includes an internal system clock signal, the interruption of which results in the interruption of the presentation of the light emitting display, and which is capable of retaining display information upon the interruption of a light sustaining signal as a result of the accumulation and retention of electrical charge across said display medium, such method comprising:
    (a) generating a turn-off signal to indicate when the presentation of the light emitting display is to be interrupted;
    (b) generating a retention signal to identify when the light emitting display is capable of retaining display information;
    (c) generating a gating signal in synchronization with the turn-off signal and the retention signal; and
    (d) interrupting the system clock signal in synchronization with the gating signal so that the presentation of the light emitting display is interrupted.

9. An apparatus for modulating the perceptible intensity of the presentation of a light emitting display, said light emitting display being of the type which emits light by the ionization discharge of a display medium, and which includes a system clock signal, the interruption of which causes an interruption in the presentation of the light emitting display, and which is capable of retaining display information upon the interruption of a light sustaining signal as a result of the accumulation and retention of electrical charge across the display medium, such apparatus comprising:
- (a) repetition means for generating a repetition pulse train signal having an adjustable frequency which is lower than the frequency of the system clock signal;
- (b) indication means for generating a retention signal which identifies when the light emitting display is capable of retaining display information;
- (c) synchronization means coupled to said repetition means and to said indication means for generating a gating signal which is in synchronization with the repetition pulse train signal and the retention signal; and
- (d) stopping means coupled to said synchronization means for interrupting the system clock signal of the light emitting display in synchronization with the gating signal.

10. The apparatus of claim 9 which further comprises a clock means for generating a clock pulse train signal, said stopping means being coupled to said clock means and to said synchronization means, and said stopping means generating a simulated system clock signal by interruption the clock pulse train signal in synchronization with the gating signal, said simulated system clock signal being connected to said light emitting display such that the simulated system clock signal overrides the system clock signal of the light emitting display whereby the presentation of the light emitting display is modulated.

11. The apparatus of claim 9 wherein the frequency of the repetition pulse train signal is adjustable between zero and 100 Hz.

12. The apparatus of claim 9 wherein the duty cycle of the repetition pulse train signal is adjustable between zero and 100%.

13. The apparatus of claim 9 wherein the inactive portion of the repetition pulse train signal indicates when the presentation of the light emitting display is to be interrupted.

14. The apparatus of claim 9 wherein the active state of the retention signal identifies when the light emitting display is capable of retaining display information.

15. The apparatus of claim 9 wherein the active portion of the gating signal is in synchronization with the active state of the repetition pulse train signal and wherein the inactive portion of the gating signal is in synchronization with the inactive state of the repetition signal and the active state of the retention signal.

16. The apparatus of claim 9 wherein the system clock is interrupted in synchronization with the inactive state of the gating signal.

17. A method for modulating the perceptible intensity of a light emitting display, said light emitting display being of the type which emits light by the ionization discharge of a display medium, and which includes a system clock signal, the interruption of which causes an interruption in the presentation of the light emitting display, and which is capable of retaining display information on the interruption of a light sustaining signal as a result of the accumulation and retention of electrical charge across the display medium, such method comprising:
- (a) generating a repetition pulse train signal which has an adjustable frequency which is lower than the frequency of the system clock;
- (b) generating a retention signal which identifies when the light emitting display is capable of retaining display information;
- (c) generating a gating signal which is in synchronization with the repetition pulse train signal and the retention signal;
- (d) interruption the system clock in synchronization with the gating signal;
- (e) adjusting the duty cycle of the repetition pulse train signal so that the perceptible intensity of the light emitting display is modulated; and
- (f) adjusting the frequency of the repetition pulse train signal so that the perceptible intensity of the light emitting display is modulated and so that no perceptible flicker is detected.

* * * * *